United States Patent [19]

Ring

[11] Patent Number: 5,741,036
[45] Date of Patent: Apr. 21, 1998

[54] PET WASTE SCOOP ASSEMBLY

[76] Inventor: Irving Ring, 214 Fourth St., Del Mar, Calif. 92014

[21] Appl. No.: 769,637

[22] Filed: Dec. 12, 1996

[51] Int. Cl.$^6$ ..................................................... A01K 29/00
[52] U.S. Cl. ........................... 294/1.3; 294/55; 209/418
[58] Field of Search ........................... 294/1.3–1.5, 49, 294/51, 52, 55, 55.5, 59, 131; 56/400.04, 400.11; 209/417–419; 119/161, 165, 166

[56] References Cited

U.S. PATENT DOCUMENTS

| D. 255,951 | 7/1980 | Halls et al. | D30/99 |
|---|---|---|---|
| D. 347,497 | 5/1994 | Van Skiver | D30/162 |
| 1,471,989 | 10/1923 | Weis | 56/400.04 |
| 2,649,604 | 8/1953 | Hess | 15/236 |
| 4,019,768 | 4/1977 | Niece | 294/19 R |
| 4,138,153 | 2/1979 | Brown | 294/1 R |
| 4,154,389 | 5/1979 | Dell'Anno | 229/38 |
| 4,243,259 | 1/1981 | Wright | 294/1 B |
| 4,483,560 | 11/1984 | Lordi | 294/1 B |
| 4,838,327 | 6/1989 | Ambler et al. | 141/114 |
| 4,969,675 | 11/1990 | Zahrowski | 294/1.3 |
| 5,186,322 | 2/1993 | Harreld et al. | 294/1.3 |
| 5,186,506 | 2/1993 | Gale | 294/1.3 |
| 5,190,326 | 3/1993 | Nunn | 294/1.3 |
| 5,400,572 | 3/1995 | Peck et al. | 53/459 |
| 5,562,318 | 10/1996 | McBroom | 294/1.4 |
| 5,564,762 | 10/1996 | Ring | 294/1.3 |
| 5,564,763 | 10/1996 | Mercurio | 294/1.3 |

FOREIGN PATENT DOCUMENTS 2245818  1/1992  United Kingdom .

*Primary Examiner*—Dean Kramer
*Attorney, Agent, or Firm*—Brown, Martin, Haller & McClain

[57] ABSTRACT

An animal waste scoop assembly, with a handle portion and a shovel portion with a series of spaced fingers, and is used in conjunction with a disposable bag to collect solid pet waste. The bag has a plurality of spaced fingers for fitting over the respective fingers of the shovel. The user first pulls a bag over the shovel so that each finger on the bag engages over a respective finger of the shovel, then grips the handle beneath the open end of the bag, and positions the shovel beneath any solid waste. The shovel member is then lifted so that the solid waste remains on top of the fingers and any clean particles sift down between the fingers. At this point, the bag is inverted in order to remove it from the shovel member and also retain the solid waste within the bag. The bag and its contents can then be discarded.

10 Claims, 2 Drawing Sheets

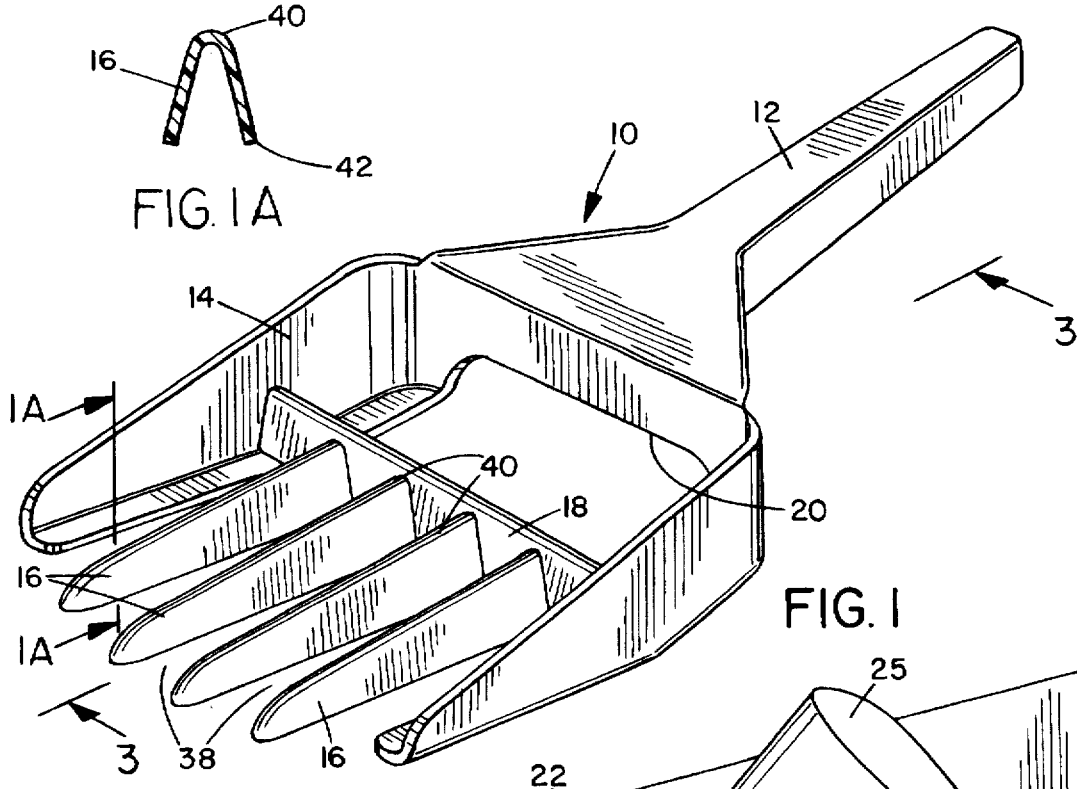
FIG. 1A
FIG. 1
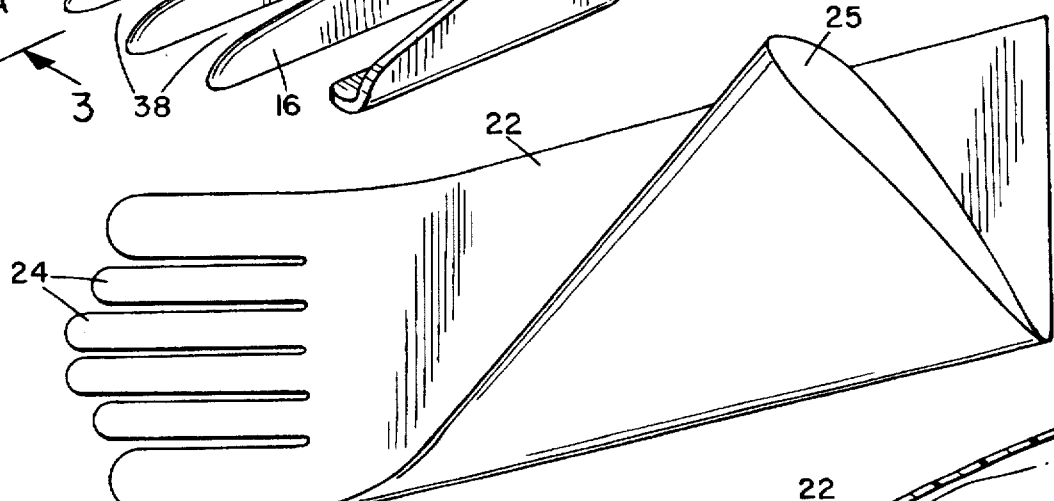
FIG. 2
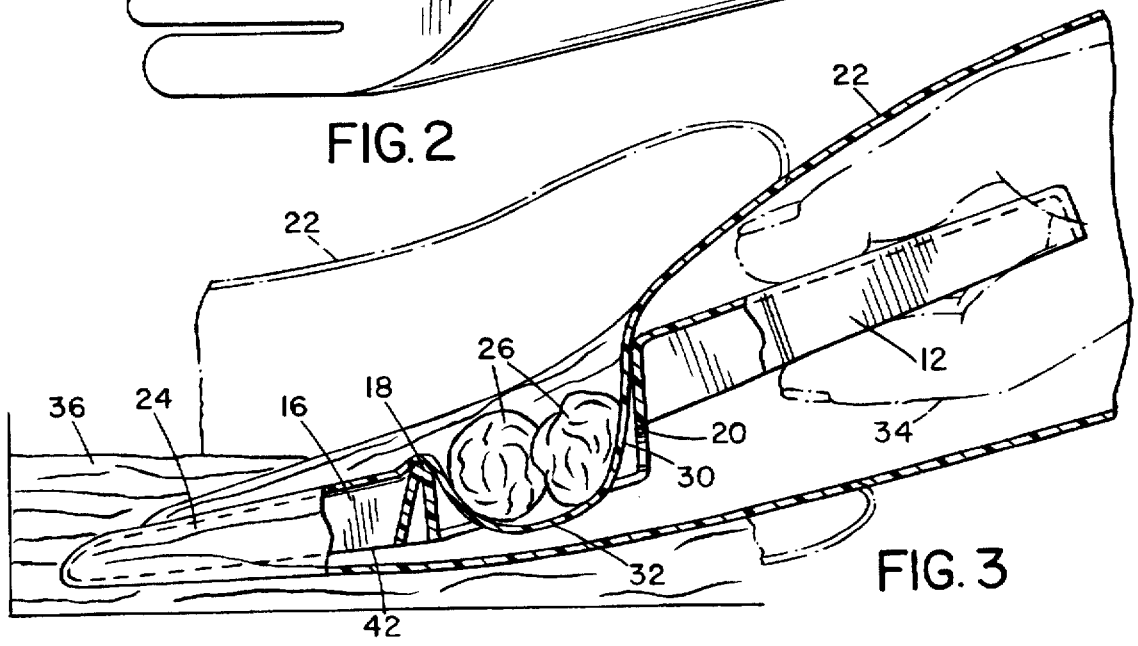
FIG. 3

5,741,036

1
PET WASTE SCOOP ASSEMBLY

BACKGROUND OF THE INVENTION

The present invention relates generally to pet waste scoops for use in picking up and removing animal waste from animal litter boxes or other areas, and is particularly concerned with a scoop assembly designed for removing solid waste matter from pet litter.

Indoor pets such as cats and the like are commonly provided with a box of litter, sand, or granular material for toilet purposes. Pet owners generally use scoops or the like to remove solid waste from the litter at periodic intervals, rather than discarding the entire volume of litter each time it is soiled. Typically such scoops are spatulas with slots to sift out the clean litter from the solid waste picked up on the spatula. The solid waste is then disposed of in a suitable container.

There are several problems with this existing method of cleaning pet litter. First, the action of sifting introduces dust into the air which may be inhaled by the user. Such dust can carry disease, and cat litter dust is a known source of the disease toxoplasmosis, which can be dangerous to certain individuals, particularly pregnant women. Another problem is that the scoop, which is generally of plastic or metal, becomes soiled with each use and must be cleaned to retain it in a sanitary condition. A further problem is the risk of soiling of the user's hands in transferring the solid waste from the scoop to a suitable container for disposal.

U.S. Pat. No. 5,190,326 of Nunn describes a cat litter box cleaner in which a slotted litter shovel is secured to the front edge of a hand held container. The user scoops solid matter and litter onto the shovel, shakes the litter through the slots in the shovel, and then tilts the assembly back to allow the retained fecal matter to fall from the shovel into the container. A disposable plastic bag may be retained in the container to facilitate the disposal of the waste material. However, this does not avoid the problem of soiling of the litter shovel itself.

SUMMARY OF THE INVENTION

It is an object of the present invention to provide a new and improved scoop or shovel assembly for removal of solid animal waste from litter boxes and other areas.

According to the present invention, an animal waste scoop assembly is provided, which comprises a shovel member having a handle portion and a shovel portion projecting forwardly from the handle portion, the shovel portion having a series of spaced fingers, and a disposable bag having an open end for fitting over the shovel and handle portion, the bag having a plurality of spaced fingers for fitting over the respective fingers of the shovel portion and an intermediate portion extending from the fingers to the open end of the bag for covering the remainder of the shovel member including the hand of a user gripping the handle portion beneath the bag.

In order to use the assembly, the user will first pull a bag over the shovel member so that each finger on the bag engages over a respective finger of the shovel member. The user then grips the handle portion beneath the open end of the bag, and digs the shovel portion through the cat litter or the like so that the shovel portion is positioned beneath any solid waste. The shovel member is then lifted so that the solid waste remains on top of the fingers and any clean litter particles sift down between the fingers and back into the litter box. At this point, the bag can be simply inverted or

2 turned inside out in order to remove it from the shovel member and also retain the solid waste within the bag. During the entire procedure, both the shovel member and the user's hand are completely shielded from contact with the waste material, considerably reducing the risk of soiling or contamination. The inverted bag and its contents can be suitably discarded, leaving the shovel member completely clean and ready for the next use. At the next use, a new bag is placed over the shovel member in the same manner.

Preferably, the shovel member has an opening or recess to the rear of the fingers, into which a portion of the bag is pushed prior to use of the shovel. This forms a recessed region or pocket for collecting solid waste. An upwardly projecting rib extends across one end of the opening between the opening and the fingers. After waste is collected on the fingers, the shovel member may be tilted back to allow the solid waste to fall into the recessed region of the bag. The previously collected waste is then securely held in position in the recessed portion of the bag behind the rib as the shovel is tilted downwards to dig into the litter and collect more waste. This procedure is repeated until the litter box is clean. The bag is then inverted to contain the waste material. In this way, instead of having to dispose of each small portion of waste immediately after it is collected on the fingers or shovel, the shovel can be used repeatedly before disposing of all collected waste in the same bag.

The shovel member will be of any suitably durable material, such as plastic. After the initial purchase of the shovel member, the user only needs to purchase supplies of disposable bags for fitting over the shovel member as needed, providing an inexpensive and convenient litter cleaning system.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which:

FIG. 1 is a pictorial view of the shovel member of a scoop assembly according to a preferred embodiment of the present invention;

FIG. 1A is a cross-section through one of the fingers of the shovel;

FIG. 2 is a plan view, on a reduced scale, of a glove-type shield or bag for use with the scoop;

FIG. 3 is a sectional view taken on line 3—3 of FIG. 1, showing the shovel member in use with the glove.

DESCRIPTION OF THE PREFERRED EMBODIMENT

Figure 4:
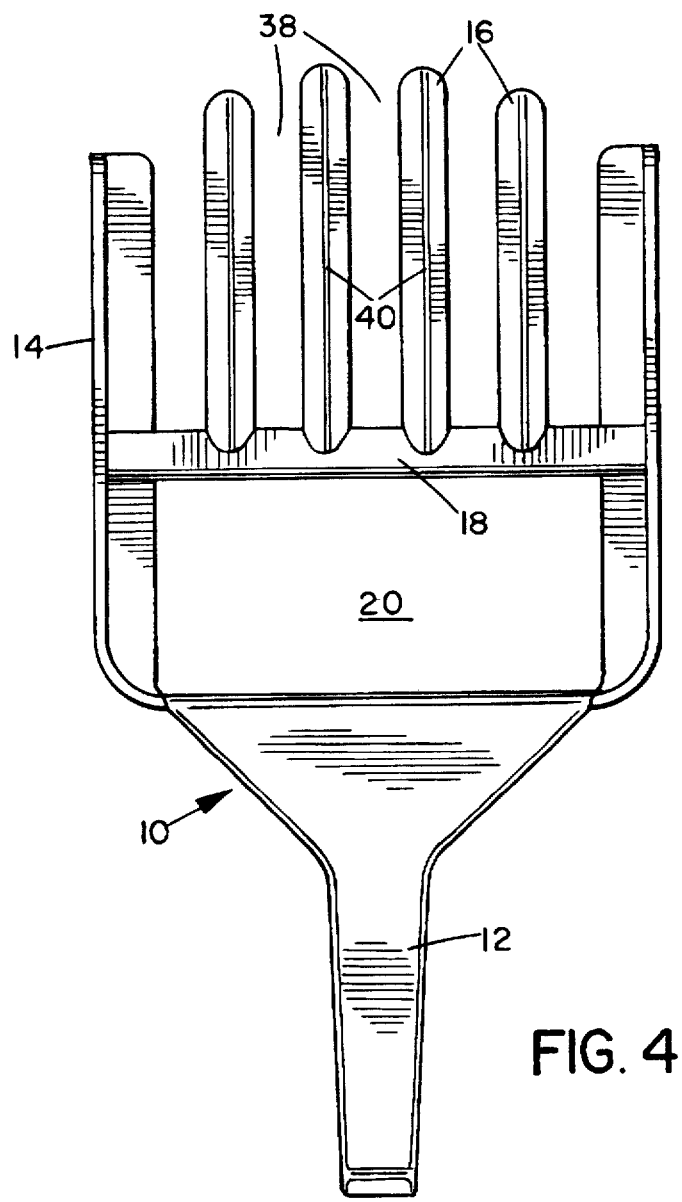
FIG. 4 is a top plan view of the shovel of FIG. 1.

FIGS. 1, 2 and 4 of the drawings illustrate the two parts of a pet waste scoop assembly according to a preferred embodiment of the present invention, while FIG. 3 illustrates the method of using the assembly. The first part of the assembly comprises a scoop or shovel member 10 of a suitably durable, rigid material such as plastic or metal. Member 10 has a handle portion 12 and a shovel or scoop portion 14 projecting forwardly from the handle portion. Scoop portion 14 has a plurality of spaced fingers 16, with a transverse barrier or rib 18 projecting across the inner ends of the fingers, and an opening or well 20 to the rear of rib 18.

As illustrated in FIG. 2, the second part of the assembly comprises a disposable glove-type shield or bag 22. The bag or glove 22 is of a similar plastic material to that used for garbage bags and the like. Bag 22 has a plurality of spaced fingers 24 at one end, and is open at the opposite end 25. The bag tapers outwardly in width from the finger end to the open end.

Using the shovel and bag combination, a user can clean out solid waste or fecal matter 26 from a cat litter box 28 as generally illustrated in FIG. 3. The user first takes a clean, unused glove or bag 22 and pulls it over the shovel 10 so that each bag finger 24 engages over a corresponding finger 16 of the scoop portion 14 of the shovel, and the remainder of the bag 22 extends rearwardly to completely cover the handle 12, as illustrated in FIG. 3. The shovel is now completely shielded, with all surfaces covered by the glove or bag 22. The user then pushes a portion 30 of the bag lying over opening 20 down through the opening to form a recessed area or pocket 32. At this point, the combination is ready for use. The user then grips handle 12 beneath the bag with a hand 34, and proceeds to dig into the particulate litter material 36 until the fingers 16 are located beneath the solid waste 26 to be picked up. The shovel is then raised, retaining the solid matter or waste 26 as well as soiled, clumped litter on the fingers 16, while clean particulate litter material 36 will fall down through the gaps 38 between adjacent fingers. At this point, the shovel is simply tilted back slightly so that the solid waste 26 falls back from the fingers and into the pocket or recessed region 32, as illustrated in FIG. 3. The shovel can then be tilted forward to dig into the litter again, as in FIG. 3, while the waste already picked up is held in recessed region 32 by the rib or dam 18, so that it cannot fall off the shovel. The procedure is repeated until all solid waste has been picked up. At this point, the user grips the open end of the bag and pulls it forwards, as indicated in dotted outline in FIG. 3, so as to invert the bag over the solid waste 26 and simultaneously remove the bag from the shovel 10. The waste is then hygienically contained within the inverted bag, while the shovel is free and completely clean, ready for the next use. The waste and used bag can then be discarded in an appropriate refuse container.

As best illustrated in FIG. 1, the fingers 16 are rounded and tapered vertically at their forward ends to enable easy sifting or digging through the particulate material in box 28. This also allows the bag fingers to engage and disengage readily and smoothly over the scoop fingers without snagging or catching on anything. The separation or gap 38 between the fingers is uniform along their length, as illustrated in FIG. 4, and is arranged such that solid material will be retained while particulate material will sift readily between the fingers without requiring excessive shaking. In practice, it has been found that the width of gap 38 between each adjacent pair of fingers should preferably be of the order of 0.15 inch to 0.4 inch to achieve this objective. Additionally, as best illustrated in FIG. 1A, the individual fingers are each of generally inverted V-shape configuration, and taper outwardly from their upper central edges 40, which each form a ridge, towards their lower edge 42, forming a downwardly tapering gap 38 which also acts to help in sifting out the particulate material without requiring excessive shaking of the shovel, as would be necessary if the fingers were flat. This arrangement helps to reduce the amount of material which becomes airborne and potentially causes a health hazard to the individual cleaning out the cat litter box.

The inverted V shape of the fingers makes the fingers stronger and more rigid. It also allows the small clean litter particles to drop down easily between the fingers, while retaining the larger waste and clumped litter on the fingers.

Although the pet waste scoop assembly is described above for use in cleaning out a cat litter box, it will be understood that it may be readily used to clean pet waste from other areas, such as a backyard or any outdoor location where a pet is exercised, for example. It is easy to use and relatively inexpensive, since the scoop itself can be reused and the user only needs to have a supply of the relatively inexpensive, disposable gloves or bags 22 to place over the scoop each time it is used. The technique is significantly cleaner and more hygienic than previous devices and methods used for similar purposes, since the scoop itself is never exposed during use and thus cannot become soiled. Also, the scoop can be used repeatedly without having to dispose of any waste picked up each time, since the first waste picked up is retained behind dam 18 in the recessed region 32 so that more waste can be picked up before all picked up waste is disposed of in the bag. This is unlike previous spatula devices, where any waste picked up, however small, must be disposed of before more waste can be picked up. The bag will also act to shield the user's hand against any unpleasant soiling or contamination.

Although a preferred embodiment of the present invention has been described above by way of example only, it will be understood by those skilled in the field that modifications may be made to the disclosed embodiment without departing from the scope of the present invention, which is defined by the appended claims.

I claim:

1. An animal waste scoop assembly, comprising:
    a shovel member having a handle portion and a shovel portion projecting forwardly from the handle portion, the shovel portion having a series of spaced fingers; and
    a disposable bag having an open end for fitting over the shovel and handle portion, the bag having a plurality of spaced fingers for fitting over the respective fingers of the shovel portion and an intermediate portion extending from the fingers to the open end of the bag for covering the remainder of the shovel member including the hand of a user gripping the handle portion beneath the bag.

2. The assembly as claimed in claim 1, wherein the shovel portion has an opening between the fingers and the handle portion.

3. The assembly as claimed in claim 2, wherein each finger has an inner end and an outer free end, and the shovel portion has an upwardly projecting ridge extending transverse to the handle portion across the opening adjacent the inner ends of the fingers.

4. The assembly as claimed in claim 1, wherein a gap of predetermined width is provided between each adjacent pair of fingers.

5. The assembly as claimed in claim 4, wherein the width of the gap is in the range from 0.15 inch to 0.4 inch.

6. The assembly as claimed in claim 1, wherein the bag is of gradually increasing width from the fingers to the open end of the bag.

7. The assembly as claimed in claim 1, wherein each finger of the shovel portion has an inverted V-shape configuration.

8. A method of collecting and disposing of animal waste, comprising the steps of:
    pulling the open end of a bag over a shovel member towards a handle end of the shovel member;
    engaging each one of a plurality of fingers on the bag over a corresponding finger of the shovel member and continuing to pull the open end of the bag rearwardly to cover the entire shovel member;

gripping the handle portion of the shovel member beneath the open end of the bag;

digging the shovel portion beneath a waste-covered area so that the shovel portion is positioned beneath any solid waste;

lifting the shovel member upwardly so that the solid waste remains on top of the fingers and any other particles sift down between the fingers;

pulling the open end of the bag back outwardly and forwardly over the solid waste to remove the bag from the shovel member and invert the bag to contain the solid waste within the bag; and discarding the bag and waste material.

9. The method as claimed in claim 8, including the step of placing a new bag over the shovel member with the fingers of the bag engaging over the fingers of the shovel member, and repeating the procedure to collect any additional waste.

10. The method as claimed in claim 8, including the steps of pushing a portion of the bag located between the fingers and the open end of the bag down through an opening in the shovel member to form a recessed area adjacent the fingers and, after collecting waste onto the fingers, tilting the shovel member to allow the waste to roll into the recessed area where it is retained while more waste is collected on the fingers before inverting the bag over it.

* * * * *